(12) United States Patent
Cho et al.

(10) Patent No.: US 8,300,689 B2
(45) Date of Patent: Oct. 30, 2012

(54) APPARATUS AND METHOD FOR ENCODING AND DECODING IMAGE CONTAINING GRAY ALPHA CHANNEL IMAGE

(75) Inventors: Daesung Cho, Seoul (KR); Hyun Mun Kim, Seongnam-si (KR); Wooshik Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1860 days.

(21) Appl. No.: 11/072,492

(22) Filed: Mar. 7, 2005

(65) Prior Publication Data
US 2005/0196062 A1 Sep. 8, 2005

(30) Foreign Application Priority Data

Mar. 5, 2004 (KR) .................. 10-2004-0015152
Feb. 4, 2005 (KR) .................. 10-2005-0010855

(51) Int. Cl.
*H04N 7/12* (2006.01)
(52) U.S. Cl. ................................. 375/240.08
(58) Field of Classification Search .............. 375/240.08
See application file for complete search history.

(56) References Cited

U.S. PATENT DOCUMENTS

| | | | | |
|---|---|---|---|---|
| 6,618,444 B1* | 9/2003 | Haskell et al. | ........... | 375/240.24 |
| 6,738,424 B1* | 5/2004 | Allmen et al. | ........... | 375/240.08 |
| 2001/0024471 A1* | 9/2001 | Bordes et al. | ............ | 375/240.12 |
| 2002/0191846 A1* | 12/2002 | Crinon et al. | ................. | 382/173 |
| 2003/0112867 A1* | 6/2003 | Hannuksela et al. | .... | 375/240.08 |

OTHER PUBLICATIONS

European Search Report issued Nov. 14, 2006 by the European Patent Office re: European Patent Application No. 05251304.1 (3 pp).

(Continued)

*Primary Examiner* — Jayanti K Patel
*Assistant Examiner* — Richard Torrente
(74) *Attorney, Agent, or Firm* — Staas & Halsey LLP

(57) ABSTRACT

An apparatus and a method for encoding and/or decoding an image containing a gray alpha channel image. The apparatus for encoding an image includes a block data reception unit receiving image data of a block currently being input to the apparatus and classifies the current block either as a foreground image portion or as a background image portion according to values of gray alpha components in the current block; a foreground image encoding unit sequentially encoding the gray alpha components and brightness and hue components of the current block if the current block is classified as the foreground image portion; and a background image encoding unit encoding the gray alpha components of the current block if the current block is classified as the background image portion. The apparatus for decoding an image includes a bitstream interpretation unit interpreting the bitstream in units of predetermined blocks and classifies a current block obtained as one of the interpretation results either as a foreground image portion or as a background image portion; a foreground image decoding unit generating a restored gray alpha channel image and a restored brightness and hue image by sequentially decoding gray alpha components and brightness and hue components of the current block if the current block is classified as the foreground image portion; and a background image decoding unit generating a restored gray alpha channel image by decoding the gray alpha components of the current block if the current block is classified as the background image portion.

26 Claims, 14 Drawing Sheets

OTHER PUBLICATIONS

Etoh, Minoru et al. "Template-Based Video Coding with Opacity Representation," *IEEE Transactions on Circuits and Systems for Video Technology*, vol. 7, No. 1, Feb. 1997 (pp. 172-180).

Fukunaga, Shigeru, et al. eds. "MPEG-4 Video Verification Model version 16.0" International Organisation for Standardisation/Organisation Internationale de Normalisation, vol. N3312, Mar. 2000 (pp. 1-380).

He, Yong et al. "A Shape-Adaptive Particioning Method for MPEG-4 Video Encoding" from IEEE International Conference on Electronics, Circuits and Systems, Lisboa, Portugal, Sep. 7-10, 1998 (pp. 239-242).

Nunes, Paolo et al. "A Contour-based Approach to Binary Shape Coding Using a Multiple Grid Chain Code," *Signal Processing: Image Communication*, vol. 15, No. 7-8, May 2000 (pp. 585-599).

Japanese Office Action for corresponding Japanese Patent Application No. 2005-062158 dated Feb. 15, 2011.

\* cited by examiner

FIG. 4A

| 411 | 412 | 413 | 414 | 415 | 416 | 417 | 418 |
|---|---|---|---|---|---|---|---|
| MB SKIP FLAG | MB TYPE | INTRA OR INTER PREDICTION INFORMATION | GRAY CBP | GRAY PREDICTION ERROR | CBP | BRIGHTNESS PREDICTION ERROR | HUE PREDICTION ERROR |

FIG. 4B

| 421 | 422 | 423 | 424 | 425 | 426 | 427 | 428 | 429 |
|---|---|---|---|---|---|---|---|---|
| MB SKIP FLAG | MB TYPE | INTRA OR INTER PREDICTION ADDITIONAL INFORMATION OF GRAY ALPHA COMPONENTS | GRAY CBP | GRAY PREDICTION ERROR | INTRA OR INTER PREDICTION ADDITIONAL INFORMATION OF BRIGHTNESS AND HUE COMPONENTS | CBP | BRIGHTNESS PREDICTION ERROR | HUE PREDICTION ERROR |

FIG. 9
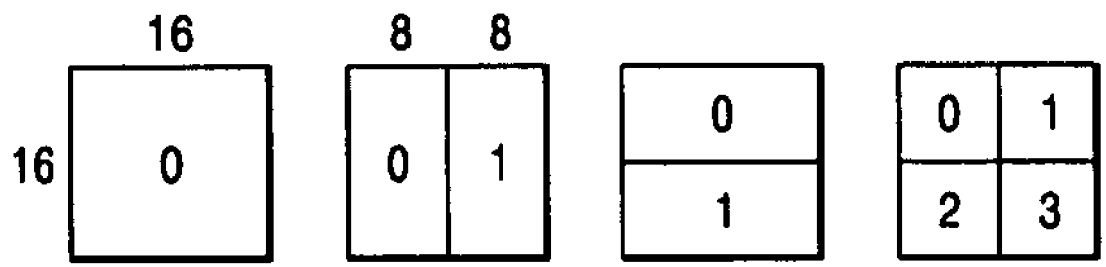
MACRO BLOCK PARTITONS : 16x16,16x8,8x16,8x8
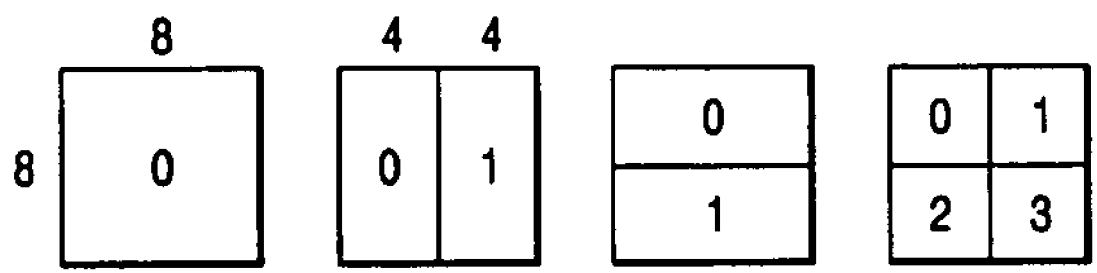
8x8 BLOCK PARTITIONS : 8x8,8x4,4x8,4x4

APPARATUS AND METHOD FOR ENCODING AND DECODING IMAGE CONTAINING GRAY ALPHA CHANNEL IMAGE

This application claims the benefits of Korean Patent Application Nos. 2004-15152, filed on Mar. 5, 2004, and 2005-10855, filed on Feb. 4, 2005 in the Korean Intellectual Property Office, the disclosures of which are incorporated herein in their entirety by reference.

BACKGROUND OF THE INVENTION

1. Field of the Invention

The present invention relates to encoding and decoding of image data, and more particularly, to an apparatus and a method for encoding and decoding an image containing a gray alpha channel image.

2. Description of the Related Art

A gray alpha channel image serves as a mask to select a specific zone in a general image. The ISO/IEC MPEG-4 standard provides a method of encoding an image in units of objects in which shape information is separately encoded so that the image is identified in the units of the objects. The shape information may be considered as a gray alpha channel image. However, since, in the MPEG-4 standard, the shape information is encoded in a different manner from general images, it is difficult to realize an apparatus for encoding an image containing a gray alpha channel image and to process the shape information in real time due to the significant amount of calculations required.

According to the H.264/MPEG4 pt. 10 AVC standard technology ("Text of ISO/IEC FDIS 14496-10: Information Technology—Coding of audio-visual objects—Part 10: Advanced Video Coding", ISO/IEC JTC 1/SC 29/WG 11, N5555, March, 2003), which has been developed by a Joint Video Team (JVT) of the ISO/IEC MPEG and ITU-T VCEG groups, general image encoding efficiency may be dramatically improved by performing spatial and temporal prediction encoding in various methods. This standard technology uses an enhanced function, integer transform coding, improves entropy coding efficiency using context adaptive binary arithmetic coding (CABAC), but fails to provide a method of processing an image containing a gray alpha channel image.

SUMMARY OF THE INVENTION

Aspects of the present invention provide an apparatus and a method for encoding and/or decoding an image containing a gray alpha channel image.

Additional aspects and/or advantages of the invention will be set forth in part in the description which follows and, in part, will be obvious from the description, or may be learned by practice of the invention.

According to an aspect of the present invention, there is provided an apparatus for encoding an image including a gray alpha channel image, which encodes an image containing gray alpha components and brightness and hue components in units of predetermined blocks, the apparatus including: a block data reception unit, which receives image data of a block currently being input to the apparatus and classifies the current block either as a foreground image portion or as a background image portion according to the values of gray alpha components in the current block; a foreground image encoding unit, which sequentially encodes the gray alpha components and brightness and hue components of the current block if the current block is classified as the foreground image portion; and a background image encoding unit, which encodes the gray alpha components of the current block if the current block is classified as the background image portion.

According to another aspect of the present invention, there is provided a method of encoding an image containing a gray alpha channel image, which encodes an image containing gray alpha components and brightness and hue components in units of predetermined blocks, the method including: classifying a current block either as a foreground image portion or as a background image portion according to the values of gray alpha components in the current block; sequentially encoding the gray alpha components and brightness and hue components of the current block if the current block is classified as the foreground image portion; and encoding the gray alpha components of the current block if the current block is classified as the background image portion.

According to another aspect of the present invention, there is provided an apparatus for decoding an image containing a gray alpha channel image, which decodes a bitstream into which an image containing gray alpha components and brightness and hue components is encoded, the apparatus including: a bitstream interpretation unit, which interprets the bitstream in units of predetermined blocks and classifies a current block obtained as one of the interpretation results either as a foreground image portion or as a background image portion; a foreground image decoding unit, which generates a restored gray alpha channel image and a restored brightness and hue image by sequentially decoding gray alpha components and brightness and hue components of the current block if the current block is classified as the foreground image portion; and a background image decoding unit, which generates a restored gray alpha channel image by decoding the gray alpha components of the current block if the current block is classified as the background image portion.

According to another aspect of the present invention, there is provided a method of decoding an image containing a gray alpha channel image, which decodes a bitstream into which an image containing gray alpha components and brightness and hue components is encoded, the method including: interpreting the bitstream in units of predetermined blocks and classifying a current block obtained as one of the interpretation results either as a foreground image portion or as a background image portion; generating a restored gray alpha channel image and a restored brightness and hue image by sequentially decoding gray alpha components and brightness and hue components of the current block if the current block is classified as the foreground image portion; and generating a restored gray alpha channel image by decoding the gray alpha components of the current block if the current block is classified as the background image portion.

According to another aspect of the present invention, the methods can be implemented by a computer-readable recording medium having embodied thereon a computer program for the methods.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 4A and 4B are diagrams illustrating the structures of bitstreams generated by the apparatus of FIG. 1A or 1B;

FIG. 9 is a diagram illustrating examples of the partitioning of a macroblock (MB) into a plurality of blocks for a temporal prediction operation;

DETAILED DESCRIPTION OF THE INVENTION

Figure 1A:
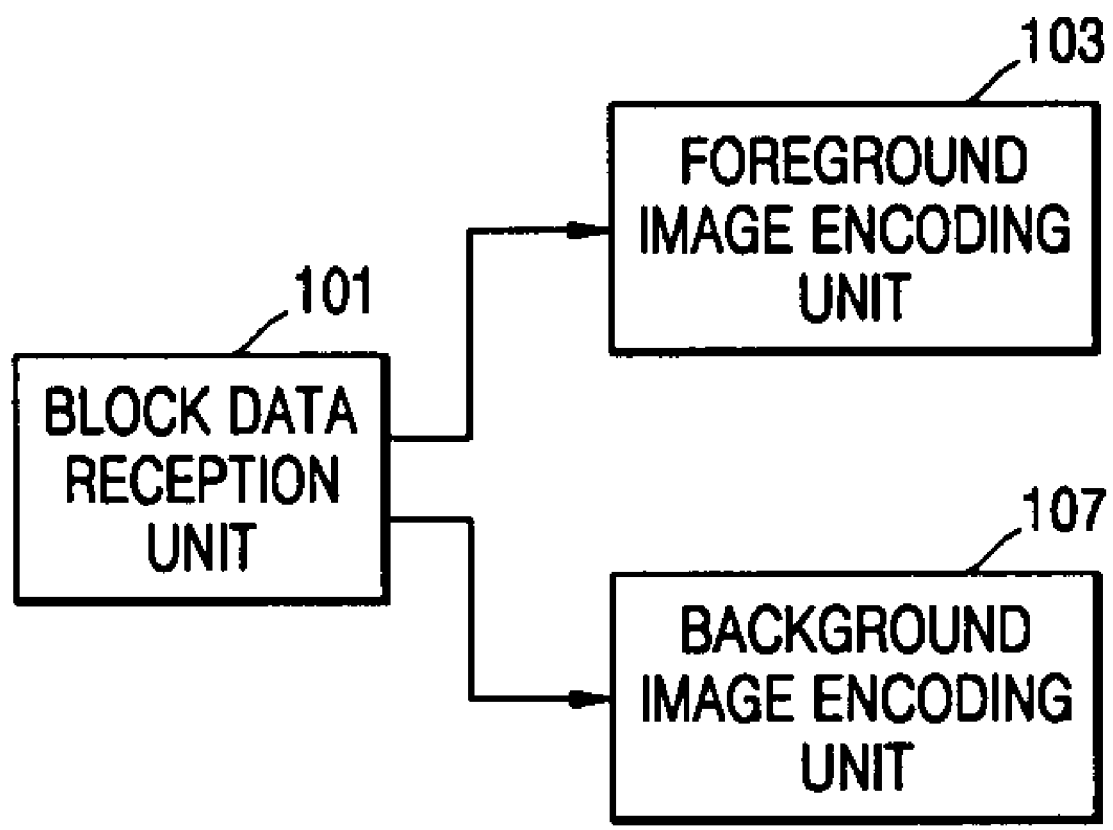
FIGS. 1A and 1B are block diagrams of an apparatus for encoding an image containing a gray alpha channel image according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1A is a block diagram of an apparatus for encoding an image containing a gray alpha channel image according to an exemplary embodiment of the present invention. Referring to FIG. 1A, the apparatus includes a block data reception unit 101, a foreground image encoding unit 103, and a background image encoding unit 107.

The block data reception unit 101 receives image data of a frame (hereinafter referred to as a current frame) currently being input to the apparatus in units of predetermined blocks, for example, in units of macroblocks (hereinafter referred to as MBs), and classifies the received blocks as either foreground image portions or background image portions according to their respective gray alpha component values.

The foreground image encoding unit 103 sequentially encodes the brightness and hue of each of the received blocks classified as foreground image portions.

The background image encoding unit 107 encodes gray alpha components of the received blocks classified as background image portions.

Figure 1B:
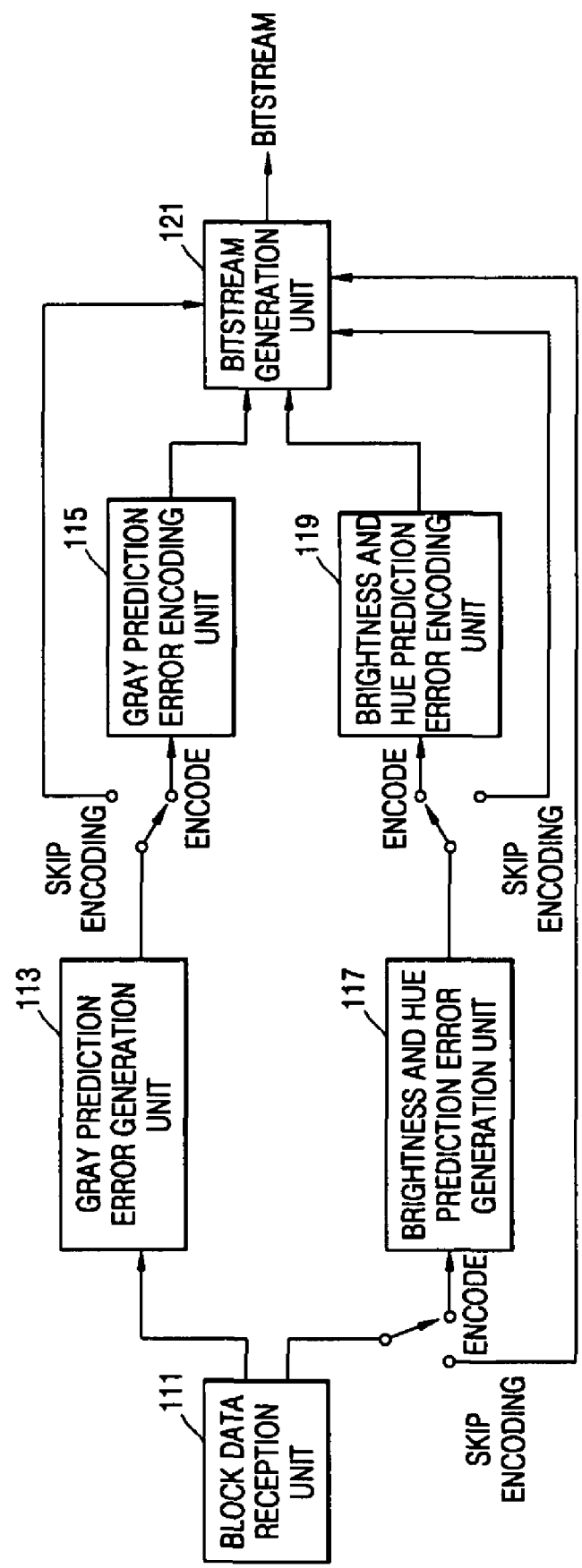

FIG. 1B is a detailed block diagram of the apparatus of FIG. 1A. Referring to FIG. 1B, the apparatus includes a block data reception unit 111, a gray prediction error generation unit 113, a gray prediction error encoding unit 115, a brightness and hue prediction error generation unit 117, a brightness and hue prediction error encoding unit 119, and a bitstream generation unit 121. The foreground image encoding unit 103 comprises the gray prediction error generation unit 113, a gray prediction error encoding unit 115, the brightness and hue prediction error generation unit 117, the brightness and hue prediction error encoding unit 119, and the bitstream generation unit 121. The background image encoding unit 105 comprises the gray prediction error generation unit 113, the gray prediction error encoding unit 115 and the bitstream generation unit 121.

The block data reception unit 111 receives image data of a current frame in units of predetermined blocks, for example, in units of MBs. Thereafter, the block data reception unit 111 provides gray alpha components of the received image data to the gray prediction error generation unit 113 and provides brightness and hue components of the received image data to the brightness and hue prediction error generation unit 117. Image data of one block is divided into gray alpha components, brightness components, and hue components. Gray alpha components of a block corresponding to a foreground image portion serve as weights for brightness and hue components of the block. For example, if a gray alpha component is represented by 8 bits, it may have a value between 0 and 255. Gray alpha components serve as weights when synthesizing a first brightness and hue image and a second brightness and hue image. Thus, if the values of the gray alpha components are closer to 255 than to 0, the first brightness and hue image is more weighted than the second brightness and hue image when synthesized with the second brightness and hue image. However, if the values of the gray alpha components are 0, the first brightness and hue image and the second brightness and hue image are synthesized with the first brightness and hue image being completely ignored. Boundary information of a foreground image zone does not need to be encoded. If the values of the gray alpha components are 0, a corresponding block is considered as being a background image portion. Otherwise, the corresponding block is considered as being a portion of the foreground image zone. Since brightness and hue components are unnecessary in a background image zone, they do not need to be encoded or decoded.

If a current block is of an intra mode, the gray prediction error generation unit 113 performs a spatial prediction operation on gray alpha components of the current block with reference to gray alpha components of blocks that are spatially adjacent to the current block and have already been restored. If the current block is of an inter mode, the gray prediction error generation unit 113 performs a temporal prediction operation on the gray alpha components of the current block with reference to gray alpha components of a frame temporally previous to the current frame. As a result of the spatial or temporal prediction operation, the gray prediction error generation unit 113 generates a temporal or spatial prediction image. Thereafter, the gray prediction error generation unit 113 performs a temporal or spatial prediction compensation operation on the temporal or spatial prediction image, thereby generating a compensated predicted image. Thereafter, the gray prediction error generation unit 113 generates gray prediction errors of the current block by subtracting gray alpha components of the compensated predicted image from the respective gray alpha components of the current block. The gray prediction error generation unit 113 compares a result of summing the absolute values of the gray prediction errors of the current block with a predetermined critical value. If the summation result is smaller than the predetermined critical value, the gray prediction error generation unit 113 skips the transforming, quantizing, and entropy-encoding the gray prediction errors of the current block and provides the gray prediction errors of the current block directly to the bitstream generation unit 121 together with information indicating that the gray prediction errors of the current block have been exempted from being transformed, quantized, and encoded. However, if the summation result is larger than the predetermined critical value, the gray prediction error generation unit 113 provides the gray prediction errors of the current block to the gray prediction error encoding unit 115. In this type of method of generating gray prediction errors, any blocks can be exempted from being encoded regardless of whether they are of an inter mode or an intra mode.

The gray prediction error encoding unit 115 transforms, quantizes, and then entropy-encodes the gray prediction errors of the current block and provides the results to the bitstream generation unit 121.

If all of the gray alpha components of the current block have a value of 0, in other words, if the current block is transparent, the brightness and hue prediction error generation unit 117 provides them directly to the bitstream generation unit 121 without the need to encode the brightness and hue components of the current block. If the current block is of an intra mode and is opaque, the brightness and hue prediction error generation unit 117 performs a spatial prediction operation on the brightness and hue components of the current block with reference to brightness and hue components of blocks which are spatially adjacent to the current block and have already been restored. On the other hand, if the current block is of an inter mode and is opaque, the brightness and hue prediction error generation unit 117 performs a temporal prediction operation on the brightness and hue components of the current block with reference to brightness and hue components of the frame temporally previous to the current frame. As a result of the spatial or temporal prediction operation, the brightness and hue prediction error generation unit 117 generates a spatial or temporal prediction image. Thereafter, the brightness and hue prediction error generation unit 117 performs a temporal or spatial prediction compensation operation on the spatial or temporal prediction image, thereby generating a compensated predicted image. Thereafter, the brightness and hue prediction error generation unit 117 generates brightness and hue prediction errors of the current block by subtracting brightness and hue components of the compensated predicted image from the respective brightness and hue components of the current block. If the gray prediction error generation unit 113 decides to skip the encoding of the gray prediction errors of the current block, the brightness and hue prediction error generation unit 117 also decides to skip the transforming, quantizing, and entropy-encoding of the brightness and hue prediction errors of the current block and provides the brightness and hue prediction errors of the current block directly to the bitstream generation unit 121 to indicate that the brightness and hue prediction errors of the current block have been exempted from being encoded. However, if the gray prediction error generation unit 113 decides to encode the gray prediction errors of the current block, the brightness and hue prediction error generation unit 117 provides the brightness and hue prediction errors of the current block to the brightness and hue prediction error encoding unit 119. In this type of method of generating brightness and hue prediction errors, blocks of an inter mode can be exempted from being encoded.

The brightness and hue prediction error encoding unit 119 transforms, quantizes, and entropy-encodes the brightness and hue prediction errors of the current block and provides the results to the bitstream generation unit 121.

The bitstream generation unit 121 generates the received image data of the current frame into a bitstream that contains the gray prediction errors and brightness and hue prediction errors of each of the blocks of the received image data of the current frame, type information, intra or inter prediction additional information, and coded block pattern (CBP) information of each of the blocks of the received image data of the current frame, and information on whether the gray prediction errors and brightness and hue prediction errors of each of the blocks of the received image data of the current frame have been exempted from being encoded. The bitstream generated by the bitstream generation unit 121 may have a structure of FIG. 4A or 4B.

Figure 2:
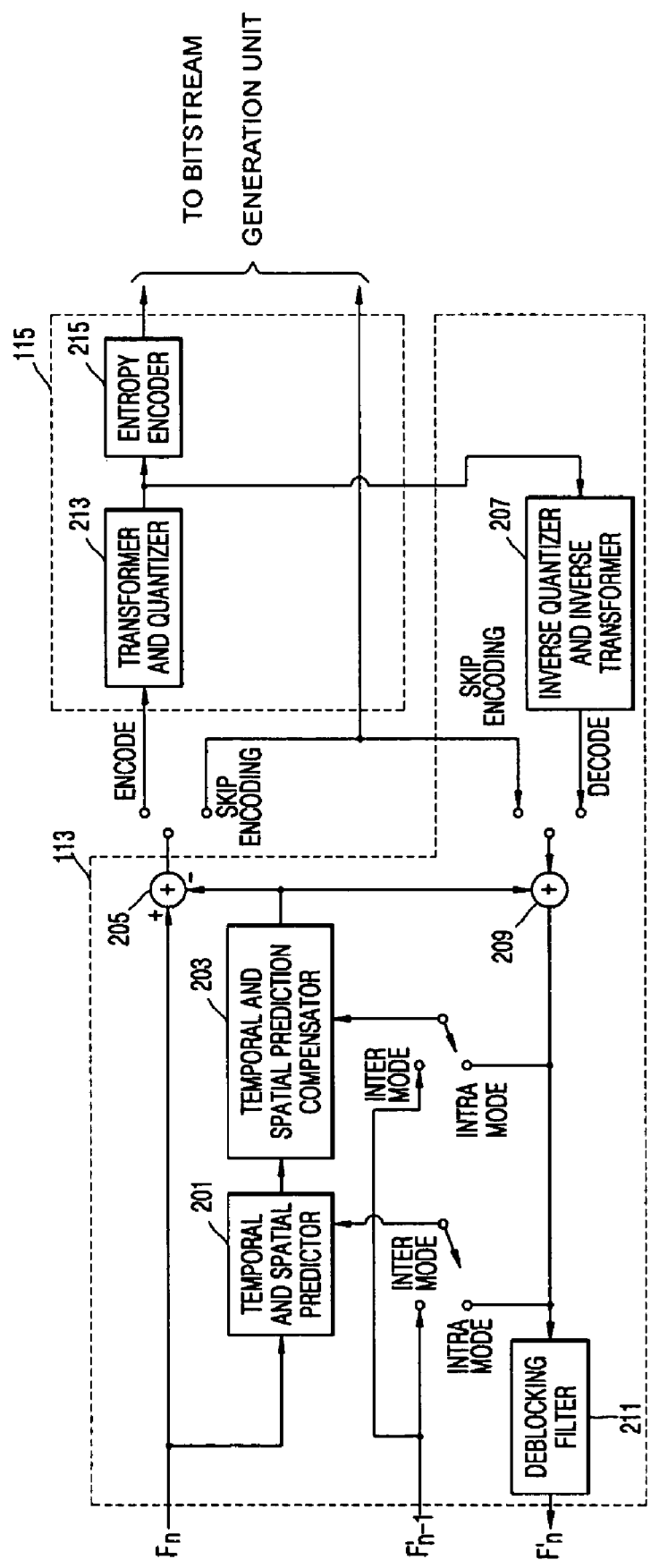
FIG. 2 is a detailed block diagram of the apparatus of FIG. 1B.

FIG. 2 is a detailed block diagram illustrating the gray prediction error generation unit 113 and the gray prediction error encoding unit 115 of FIG. 1B. Referring to FIG. 2, the gray prediction error generation unit 113 includes a temporal and spatial predictor 201, a temporal and spatial prediction compensator 203, a subtractor 205, an inverse quantizer and inverse transformer 207, an adder 209, and a deblocking filter 211. The gray prediction error encoding unit 115 includes a transformer and quantizer 213 and an entropy encoder 215.

If a current block of a gray alpha channel image Fn (hereinafter referred to as an original current gray alpha channel image) of the current frame is of an intra mode, the temporal and spatial predictor 201 generates a spatial prediction image by performing a spatial prediction operation on the current block with reference to a restored gray alpha channel image F'n (hereinafter referred to as a current restored gray alpha channel image) of the current frame. If the current block is of an inter mode, the temporal and spatial predictor 201 generates a temporal prediction image by performing a temporal prediction operation on the current block with reference to a restored gray alpha channel image F'n−1 (hereinafter referred to as a previous restored gray alpha channel image) of the previous frame.

The temporal and spatial prediction compensator 203 performs a temporal or spatial compensation operation on the temporal prediction image or the spatial prediction image provided by the temporal and spatial predictor 201, thereby generating a compensated predicted image. Thereafter, the temporal and spatial prediction compensator 203 provides the compensated predicted image to the subtractor 205 and the adder 209.

The subtractor 205 generates gray prediction errors of the current block by subtracting gray alpha components of the compensated predicted image from the gray alpha components of the original current gray alpha channel image Fn. The subtractor 205 compares a result of summing the absolute values of the gray prediction errors of the current block with a predetermined critical value and decides whether to set the gray prediction errors of the current block to 0 based on the comparison results. If the subtractor 205 decides to set all of the gray prediction errors of the current block to 0, it provides them to the bitstream generation unit 121 of FIG. 1 and the adder 209.

The inverse quantizer and inverse transformer 207 inversely quantizes and inversely transforms the gray prediction errors of the current block, which have been transformed and quantized by the transformer and quantizer 213, and provides the inversely quantized and inversely transformed gray prediction errors of the current block to the adder 209.

The adder 209 generates the current restored gray alpha channel image F'n by adding the inversely quantized and inversely transformed gray prediction errors of the current block to the compensated predicted image provided by the temporal and spatial prediction compensator 203. The current restored gray alpha channel image F'n is provided to the temporal and spatial predictor 201, the temporal and spatial prediction compensator 203, and the deblocking filter 211.

The deblocking filter 211 is used for deblocking the current restored gray alpha channel image F'n provided by the adder 209. However, the deblocking filter 211 is not necessarily required in the gray prediction error generation unit 113.

The transformer and quantizer 213 transforms and quantizes the gray prediction errors of the current block provided by the subtractor 205 and provide the transformation and quantization results to the entropy encoder 215. The transformer and quantizer 213 may transform the gray prediction errors of the current block using a discrete cosine transformation (DCT) or integer transformation method.

The entropy encoder 215 entropy-encodes the transformed and quantized gray prediction errors of the current block and provides the entropy-encoded gray prediction errors of the current block to the bitstream generation unit 121.

If the summation result is smaller than the predetermined critical value, the entropy-encoding of the transformed and quantized gray prediction errors of the current block may be skipped regardless of whether the current block is of an inter mode or an intra mode.

The brightness and hue prediction error generation unit 117 and the brightness and hue prediction error encoding unit 119 may have almost the same structures as the gray prediction error generation unit 113 and the gray prediction error encoding unit 115, respectively. However, the encoding of brightness and hue prediction errors of the current block is different from the encoding of the gray prediction errors of the current block in that it may be skipped only if a result of summing the absolute values of the brightness and hue prediction errors of the current block is smaller than a predetermined critical value and the current block is of an inter mode.

If the prediction errors of the current block have been exempted from being encoded, information indicating that the prediction errors of the current block have been exempted from being encoded is included in a bitstream corresponding to the current block without encoding pixel values of the current block. Accordingly, CBP information, motion vector information, and the pixel values of the current block are not encoded. A restored image is obtained using a compensated predicted image of blocks temporally or spatially adjacent to the current block, instead of the skipped prediction errors of the current block. For example, the location of a predetermined portion of a previous gray alpha channel image is calculated using the values of pixels corresponding to the predetermined portion of the previous gray alpha channel image or motion vectors of blocks adjacent to the current block, and the values of the pixels corresponding to the predetermined portion of the previous gray alpha channel image are used without the need to be processed.

Figure 3:
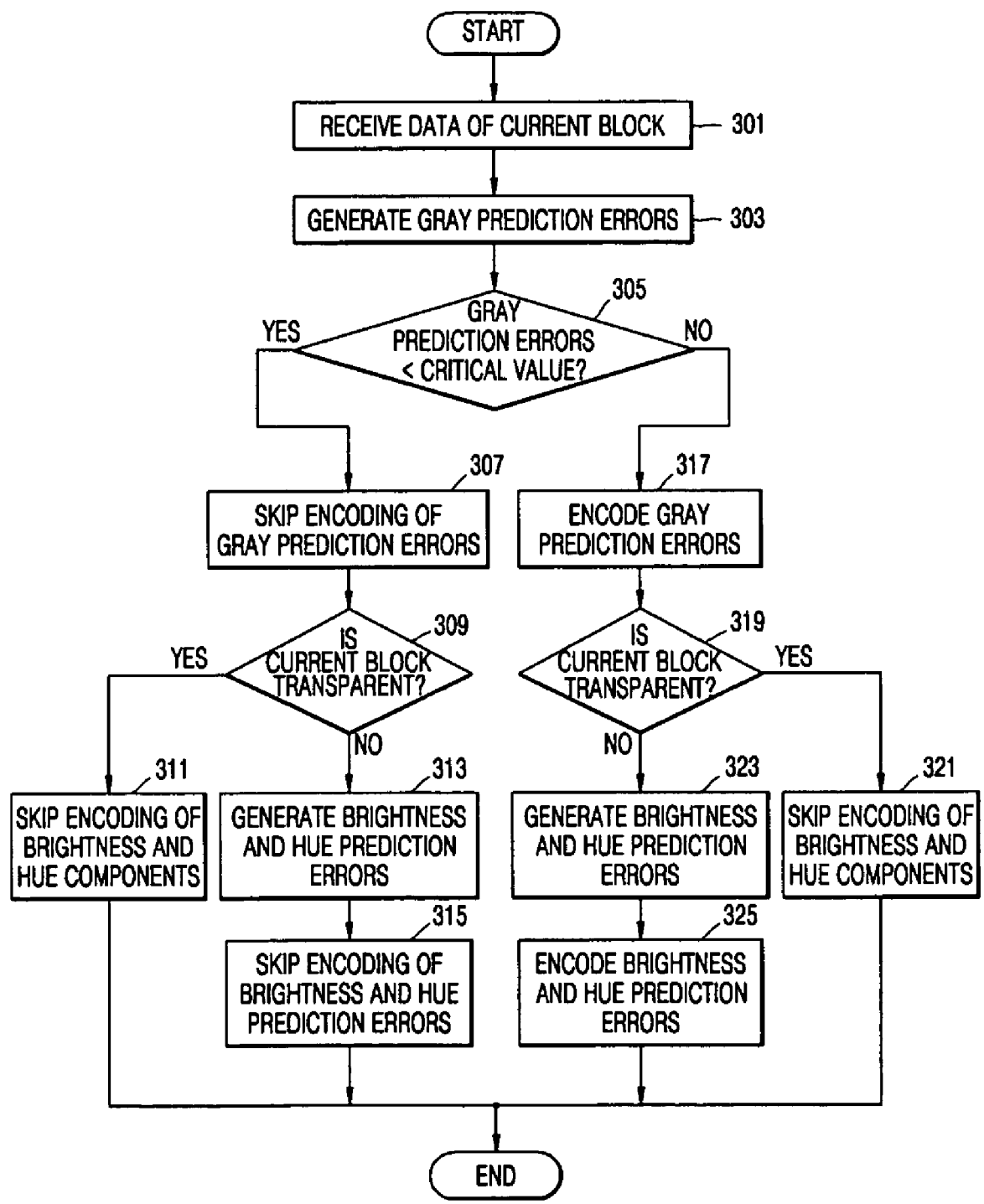
FIG. 3 is a flowchart of a method of encoding an image containing a gray alpha channel image according to an exemplary embodiment of the present invention.

FIG. 3 is a flowchart of a method of encoding an image containing a gray alpha channel image according to an exemplary embodiment of the present invention. Referring to FIG. 3, in operation 301, image data of a current frame is received in units of blocks. In operation 303, gray prediction errors of a current block are generated using gray alpha components of the current block by the gray prediction error generation unit 113.

In operation 305, a result of summing the absolute values of the gray prediction errors is compared by the subtractor 205 with a predetermined critical value. If the summation result is smaller than the predetermined critical value, encoding of the gray prediction errors of the current block is skipped in operation 307.

In operation 309, it is determined whether all of the gray alpha components of the current block included the received image data have a value of 0 (i.e., the current block is transparent). If all of the gray alpha components of the current block have a value of 0 (i.e., the current block is transparent) encoding of brightness and hue components of the current block is skipped in operation 311.

In operation 313, if some of the gray alpha components of the current block have a value other than 0 (i.e., if the current block is opaque) the brightness and hue prediction errors of the current block are generated by the brightness and hue prediction error generation unit 117.

In operation 315, encoding of the brightness and hue prediction errors of the current block is skipped because the encoding of the gray prediction errors of the current block has been skipped in operation 307.

If the summation result is larger than the predetermined critical value in operation 305, the gray prediction errors of the current block are encoded in operation 317.

In operation 319, it is determined whether all of the gray alpha components of the current block included the received image data have a value of 0 (i.e., the current block is transparent). If all of the gray alpha components of the current block have a value of 0 (i.e., the current block is transparent) the encoding of the brightness and hue components of the current block is skipped in operation 321.

In operation 323, if some of the gray alpha components of the current block have a value other than 0 (i.e., if the current block is opaque) the brightness and hue prediction errors of the current block are generated by the brightness and hue error generation unit 117.

In operation 325, the brightness and hue prediction errors of the current block are encoded by the brightness and hue prediction error encoding unit 119 because the gray prediction errors of the current block have already been encoded in operation 317.

FIGS. 4A and 4B are diagrams illustrating the structures of bitstreams generated by the apparatus of FIG. 1A or 1B. Specifically, FIG. 4A illustrates a bitstream generated by the apparatus of FIG. 1A or 1B with intra or inter prediction additional information equally applied to gray alpha components and brightness and hue components of a current block. Referring to FIG. 4A, the bitstream includes a MB skip flag 411, an MB type field 412, an intra or inter prediction additional information field 413, a gray CBP field 414, a gray prediction error field 415, a brightness and hue CBP field 416, a brightness prediction error field 417, and a hue prediction error field 418. FIG. 4B illustrates a bitstream generated by the apparatus of FIG. 1A or 1B with intra or inter prediction additional information applied to the gray alpha components of the current block independently of the brightness and hue components of the current block. Referring to FIG. 4B, the bitstream includes an MB skip flag 421, an MB type field 422, a gray intra or inter prediction additional information field 423, a gray CBP field 424, a gray prediction error field 425, a brightness and hue intra or inter prediction additional information field 426, a brightness and hue CBP field 427, a brightness prediction error field 428, and a hue prediction error field 429.

The MB skip flags 411 and 421 are fields indicating whether the gray prediction errors, brightness prediction errors, and hue prediction errors of the current block have been encoded. For example, if the MB skip flags 411 and 421 are set to 1, it appears that the encoding of the gray prediction errors, brightness prediction errors, and hue prediction errors of the current block has been skipped, and thus, intra or inter prediction additional information and the gray prediction errors, brightness prediction errors, and hue prediction errors of the current block are not encoded. Accordingly, the intra or inter prediction additional information of the current block is obtained through prediction from blocks adjacent to the current block, and the gray prediction errors, brightness prediction errors, and hue prediction errors of the current block are set to 0. If the current block is determined to be transparent based on restored gray alpha information, the brightness and hue prediction errors of the current block do not exist regardless of the values of the MB skip flags 411 and 421 and thus do not need to be encoded. Accordingly, it is possible to prevent the total amount of computations performed by the encoding and/or decoding apparatus from unnecessarily increasing.

The MB type fields 412 and 422 are fields indicating whether a prediction mode of the current block is an intra mode or an inter mode. According to the H.264 standard, the inter mode is classified into a plurality of sub-modes according to the size of blocks into which an MB is to be partitioned, and the intra mode is classified into a plurality of sub-modes according to a prediction direction in which the values of spatially adjacent pixels are predicted.

The intra or inter prediction additional information field 413, the gray intra or inter prediction additional information field 423, and the brightness and hue intra or inter prediction additional information field 426 are fields containing motion vector information and intra prediction direction information. The gray CBP fields 414 and 424 indicate CBPs of the gray alpha components of the current block, and the brightness and hue CPB fields 416 and 427 indicate CBPs of the brightness and hue components of the current block, and more particularly, indicate whether each 8×8 block has transformation coefficients having a value other than 0.

Figure 5:
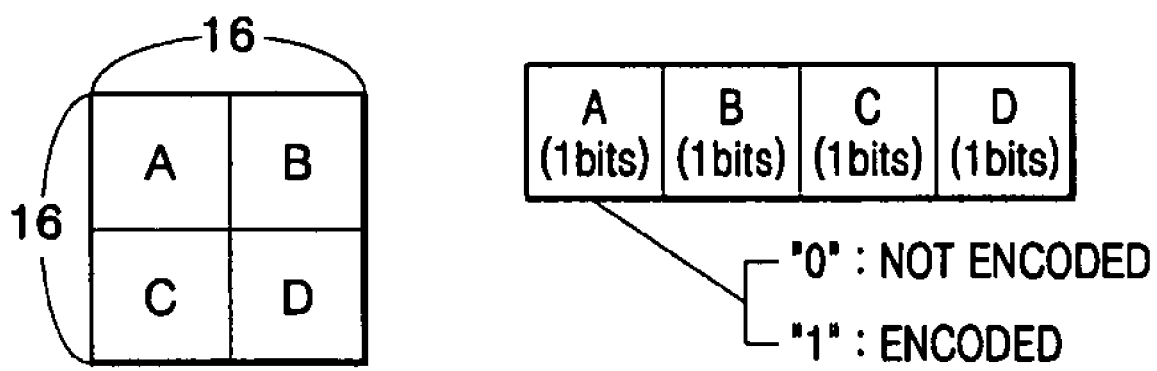
FIG. 5 is a diagram illustrating a method of generating a coded block pattern (CBP) of a gray alpha channel component according to an exemplary embodiment of the present invention.

FIG. 5 is a diagram illustrating a method of generating gray CBPs according to an exemplary embodiment of the present invention. Referring to FIG. 5, a 16×16 MB is partitioned into four 8×8 blocks, i.e., A, B, C, and D. If the blocks A, B, C, and D have been exempted from being encoded, a value of 0 is allotted to each of the blocks A, B, C, and D. However, if the blocks A, B, C, and D have been encoded, a value of 1 is allotted to each of the blocks A, B, C, and D. Accordingly, it is possible to indicate whether the encoding of each of the blocks A, B, C, and D has been skipped by allotting a value of 0 or 1 to each of the blocks A, B, C, and D.

Figure 6A:
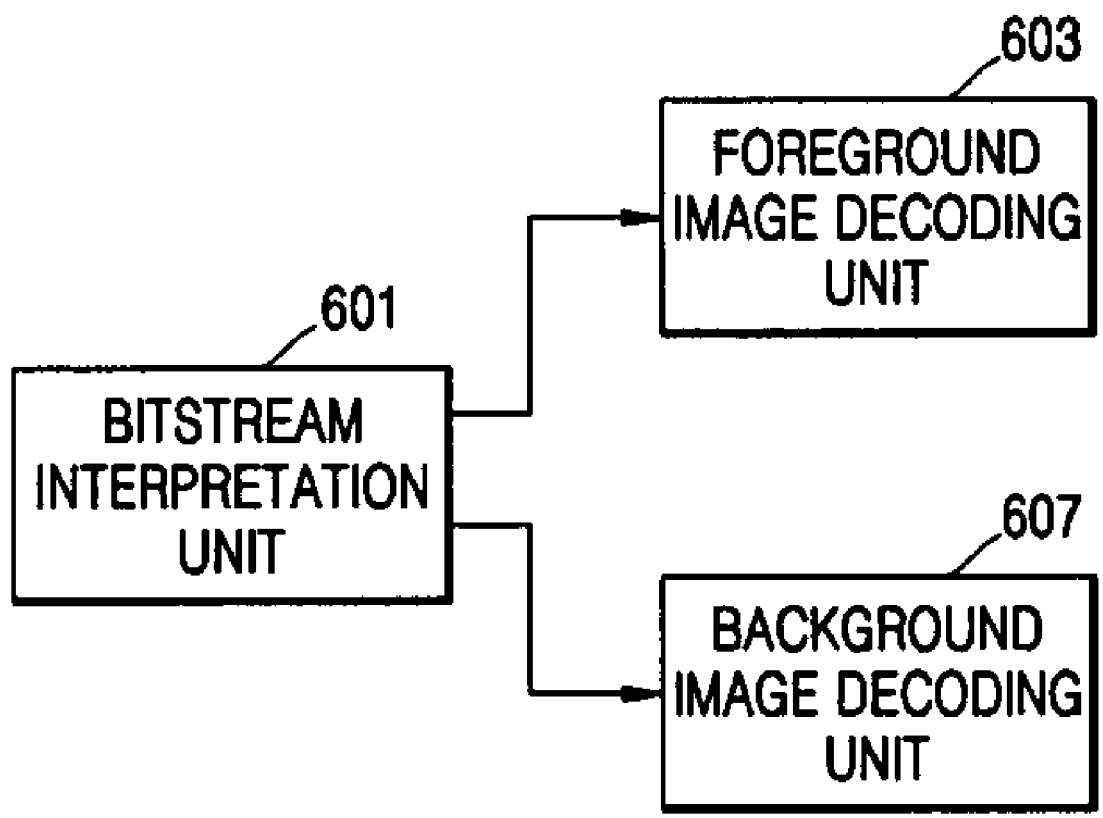
FIGS. 6A and 6B are block diagrams of an apparatus for decoding an image containing a gray alpha channel image according to an exemplary embodiment of the present invention.

FIG. 6A is a block diagram of an apparatus for decoding an image containing a gray alpha channel image according to an exemplary embodiment of the present invention. Referring to FIG. 6A, the apparatus includes a bitstream interpretation unit 601, a foreground image decoding unit 603, and a background image decoding unit 605.

The bitstream interpretation unit 601 interprets a bitstream of each of a plurality of block and classifies a corresponding block either as a foreground image portion or as a background image portion based on the interpretation results.

The foreground image decoding unit 603 sequentially decodes brightness and hue components of blocks classified as foreground image portions, thereby generating a restored gray alpha channel image and a restored brightness and hue image.

The background image decoding unit 605 decodes gray alpha components of blocks classified as background image portions, thereby generating a restored gray alpha channel image.

Figure 6B:
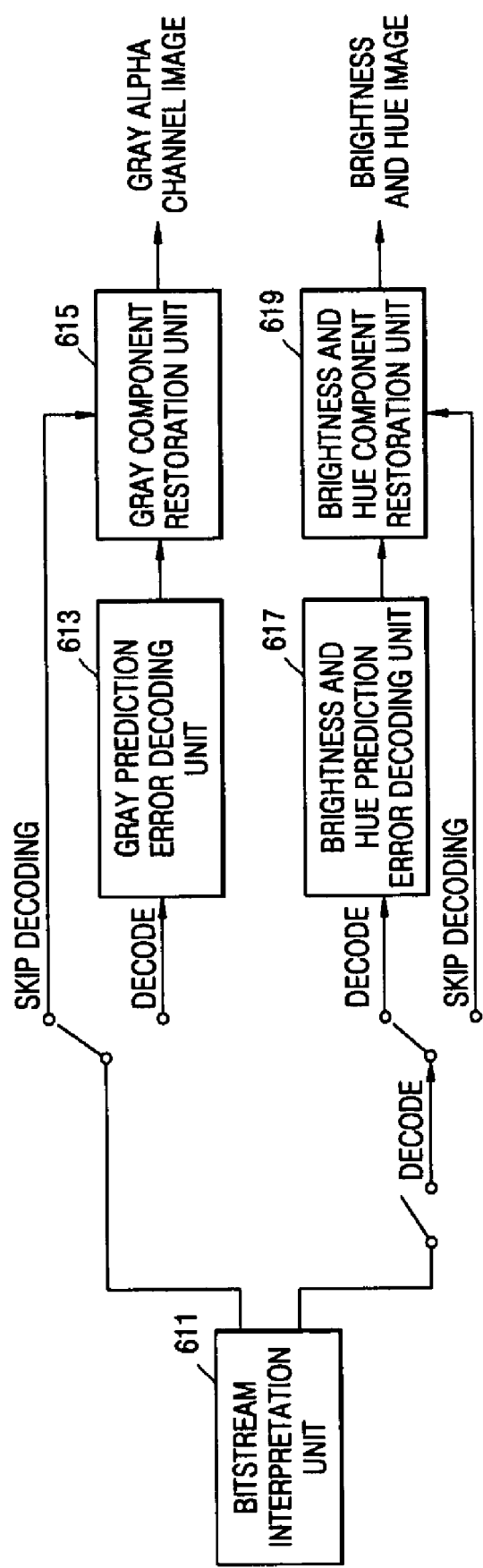

FIG. 6B is a detailed block diagram of the apparatus of FIG. 6A. Referring to FIG. 6B, the apparatus includes a bitstream interpretation unit 611, a gray prediction error decoding unit 613, a gray alpha component restoration unit 615, a brightness and hue prediction error decoding unit 617, and a brightness and hue component restoration unit 619. The foreground image decoding unit 603 comprises the gray prediction error decoding unit 613, the gray alpha component restoration unit 615, the brightness and hue prediction error decoding unit 617, and the brightness and hue component restoration unit 619. The background image decoding unit 605 comprises the gray prediction error decoding unit 613 and the gray alpha component restoration unit 615.

The bitstream interpretation unit 611 interprets an encoded bitstream of a current block.

The gray prediction error decoding unit 613 determines whether gray prediction errors of the current block have been encoded with reference to an MB skip flag 411 or 421 of the bitstream of the current block. If the gray prediction errors of the current block have been encoded (e.g., if the MB skip flag of the bitstream of the current block is set to 0) the gray prediction error decoding unit 613 decodes the gray prediction errors of the current block. However, if the gray prediction errors of the current block have been exempted from being encoded (e.g., if the MB skip flag of the bitstream of the current block is set to 1) the gray prediction error decoding unit 613 predicts the decoded gray prediction errors of the current block to be 0.

The gray alpha component restoration unit 615 determines whether a prediction mode of the current block is an intra mode or an inter mode with reference to an MB type field 412 or 422 of the bitstream of the current block and generates a restored gray alpha channel image by adding the decoded gray prediction errors of the current block to a prediction image obtained by performing a temporal or spatial prediction compensation operation on the decoded gray prediction errors of the current block.

The brightness and hue prediction error decoding unit 617 determines whether brightness and hue prediction errors of the current block have been encoded with reference to the MB skip flag 411 or 421 of the bitstream of the current block. If the brightness and hue prediction errors of the current block have been encoded (e.g., if the MB skip flag of the bitstream of the current block is set to 0) the brightness and hue prediction error decoding unit 617 decodes the brightness and hue prediction errors of the current block. However, if the encoding of the brightness and hue prediction errors of the current block has been skipped (i.e., if the MB skip flag of the bitstream of the current block is set to 1) the brightness and hue prediction error decoding unit 617 predicts the decoded brightness and hue prediction errors of the current block to be 0.

The brightness and hue component restoration unit 619 determines whether the prediction mode of the current block is an intra mode or an inter mode with reference to the MB type field 412 or 422 of the bitstream of the current block and generates a restored brightness and hue image by adding the decoded brightness and hue prediction errors of the current block to a prediction image obtained by performing a temporal or spatial prediction compensation operation on the decoded brightness and hue prediction errors of the current block.

Figure 7:
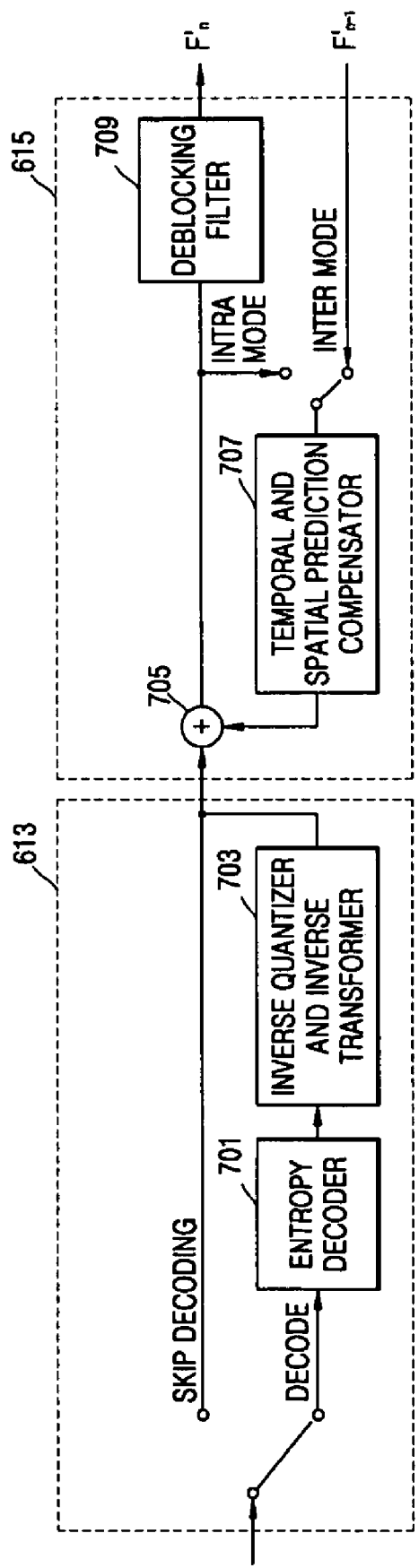
FIG. 7 is a detailed block diagram of the apparatus of FIG. 6B.

FIG. 7 is a detailed block diagram illustrating the gray prediction error decoding unit 613 and the gray alpha component restoration unit 615 of FIG. 6B. Referring to FIG. 7, the gray prediction error decoding unit 613 includes an entropy decoder 701 and an inverse quantizer and inverse transformer 703, and the gray alpha component restoration unit 615 includes an adder 705, a temporal and spatial prediction compensator 707, and a deblocking filter 709.

If the interpretation results obtained by the bitstream interpretation unit 611 of FIG. 6B show that the MB skip flag 411 or 421 of the bitstream of the current block has a value of 0, the entropy decoder 701 entropy-decodes the encoded gray prediction errors of the current block. If the interpretation results show that the MB skip flag 411 or 421 of the bitstream of the current block has a value of 1, the entropy decoder 701 sets all of the gray prediction errors of the current block to 0 and provides the setting results to the adder 705.

The inverse quantizer and inverse transformer 703 inversely quantizes and inversely transforms the entropy-decoded gray prediction errors of the current block and provides the inverse quantization and inverse transformation results to the adder 705.

The adder 705 generates a current restored gray alpha channel image F'n by adding the inversely quantization and inverse transformation results provided by the inverse quantizer and inverse transformer 703 or the setting results provided by the entropy decoder 701 to a compensated temporal or spatial prediction image.

The temporal and spatial prediction compensator 707 generates the compensated temporal or spatial prediction image by performing a temporal or spatial prediction compensation on the current restored gray alpha channel image F'n or a previous restored gray alpha channel image F'n−1, depending on whether the prediction mode is the inter or intra mode, and provides the compensated temporal or spatial prediction image to the adder 705.

The deblocking filter 709 is used for deblocking the current restored gray alpha channel image F'n provided by the adder 705. However, the gray alpha component restoration unit 615 does not necessarily need to include the deblocking filter 709.

The structures of the gray prediction error decoding unit 613 and the gray alpha component restoration unit 615 of FIG. 7 can be directly applied to the structures of the brightness and hue prediction error decoding unit 617 and the brightness and hue component restoration units 619, respectively, of FIG. 6B.

Figure 8:
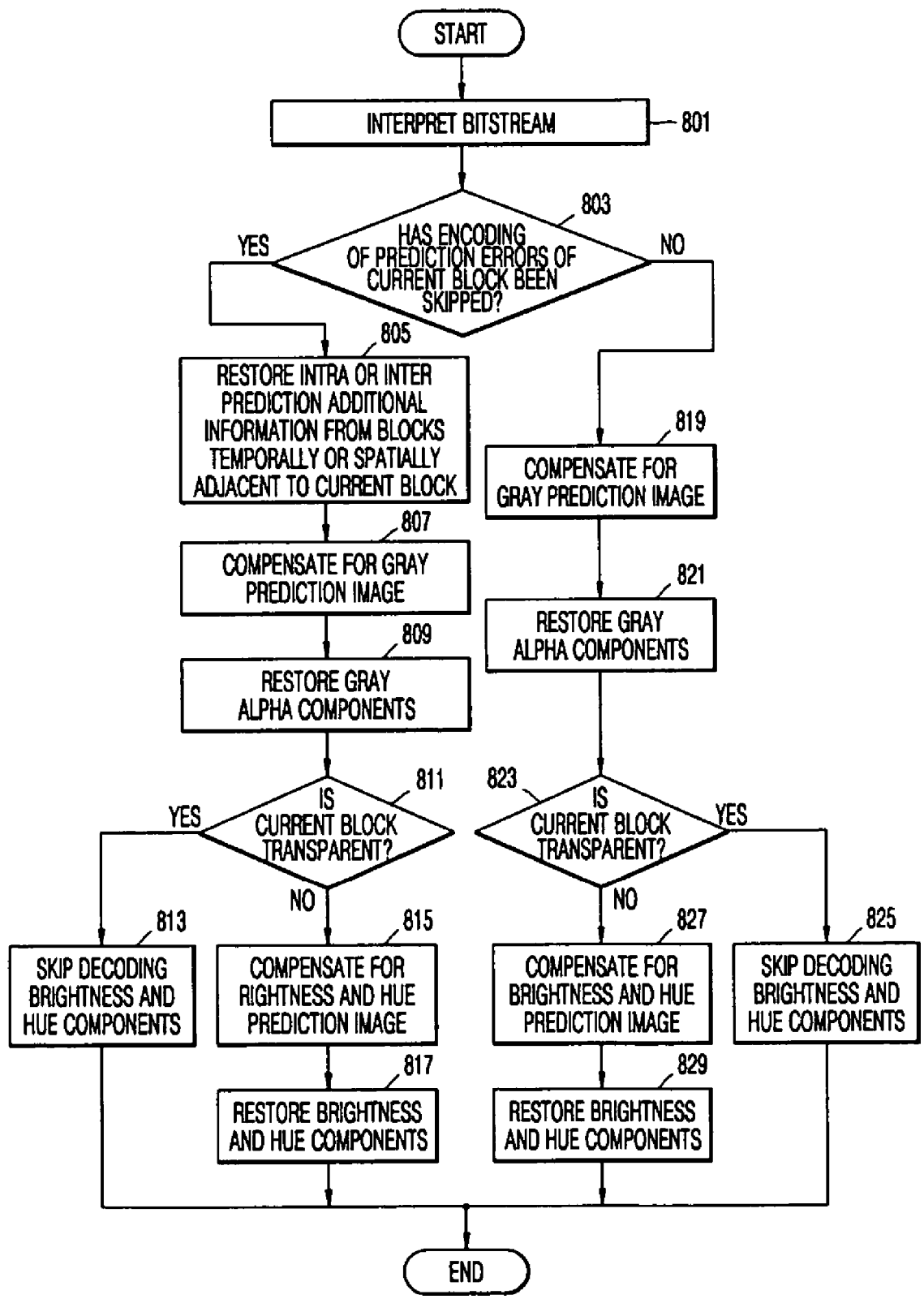
FIG. 8 is a flowchart of a method of decoding an image containing a gray alpha channel image according to an exemplary embodiment of the present invention.

FIG. 8 is a flowchart of a method of decoding an image containing a gray alpha channel image according to an exemplary embodiment of the present invention. Referring to FIG. 8, in operation 801, a bitstream of a current block is interpreted by the bitstream interpretation unit 611.

In operation 803, it is determined whether the encoding of gray prediction errors of the current block has been skipped with reference to an MB skip flag of the bitstream of the current block.

In operation 805, if the encoding of the gray prediction errors of the current block has been skipped, intra or inter prediction additional information is restored by the gray component restoration unit 615 from blocks temporally or spatially adjacent to the current block.

In operation 807, a gray prediction image is restored by the gray component restoration unit 615 using the restored intra or inter prediction additional information. In operation 809, gray alpha components of the current block are restored by the gray component restoration unit 615 using the restored gray prediction image.

In operation 811, it is determined whether all of the gray alpha components of the current block restored in operation 809 are set to 0. In operation 813, if all of the gray alpha components of the current block are set to 0, decoding of brightness and hue components of the current block is skipped. However, if some of the gray alpha components of the current block are set to a value other than 0, a brightness and hue prediction image is compensated for in operation 815. In operation 817, brightness and hue components of the current block are restored by the brightness and hue component restoration unit 619 by adding decoded brightness and hue prediction errors to the compensated brightness and hue prediction image.

In operation 819, if the gray prediction errors of the current block are determined in operation 803 to have been encoded, the gray prediction image is compensated for by the gray prediction error decoding unit 613. In operation 821, the gray alpha components of the current block are restored by the gray component restoration unit 615 by adding decoded gray prediction errors to the compensated gray prediction image.

In operation 823, it is determined whether all of the gray alpha components of the current block restored in operation 821 are set to 0. In operation 825, if all of the restored gray alpha components of the current block are set to 0, the decoding of the brightness and hue components of the current block is skipped. However, if some of the restored gray alpha components of the current block are set to a value other than 0, the brightness and hue prediction image of the current block is compensated for in operation 827 by the brightness and hue component restoration unit 619. In operation 829, the brightness and hue components of the current block are restored by adding the non-decoded brightness and hue prediction errors of the current block to the compensated brightness and hue prediction image.

Table 1 below shows different methods of encoding an image containing a gray alpha channel image performed by the apparatus for encoding an image containing a gray alpha channel image according to an exemplary embodiment of the present invention in different encoding modes (i.e., in encoding modes 1 through 4).

TABLE 1

| ENCODING MODE | MB SKIP | GRAY ALPHA COMPONENTS OF MB | ENCODING METHOD |
|---|---|---|---|
| 1 | SKIPPED (1) | OPAQUE (1) | SKIP ENCODING OF BRIGHTNESS AND HUE PREDICTION ERRORS SKIP ENCODING OF GRAY PREDICTION ERRORS |
| 2 | SKIPPED (1) | TRANSPARENT (0) | SKIP ENCODING OF BRIGHTNESS AND HUE COMPONENTS SKIP ENCODING OF GRAY PREDICTION ERRORS |
| 3 | NON-SKIPPED (0) | OPAQUE (1) | ENCODE BRIGHTNESS AND HUE PREDICTION ERRORS ENCODE GRAY PREDICTION ERRORS |
| 4 | NON-SKIPPED (0) | TRANSPARENT (0) | SKIP ENCODING OF BRIGHTNESS AND HUE COMPONENTS ENCODE GRAY PREDICTION ERRORS |

Referring to Table 1, a current block is classified either as a foreground image portion or as a background image portion depending on whether the current block includes gray alpha components having a value other than 0. If gray alpha components of the current block do not include a value other than 0 (i.e., the gray alpha components of the current block are all 0, it is considered as being a background image portion). Thus, encoding of brightness and hue components of the current block is skipped, but encoding of the gray alpha components of the current block is performed. If a result of summing gray prediction errors of the current block is smaller than a predetermined critical value, encoding of the gray prediction errors of the current block is skipped. However, if the summation result is larger than the predetermined critical value, the gray prediction errors of the current block are transformed, quantized, and entropy-encoded.

If gray alpha components of the current block include a value other than 0, it is considered as being a foreground image portion. Thus, the brightness and hue components of the current block as well as the gray alpha components of the current block are encoded. However, if the summation result is smaller than the predetermined critical value, the encoding of the gray prediction errors and brightness and hue prediction errors of the current block is skipped. If the summation result is larger than the predetermined critical value, the gray prediction errors and brightness and hue prediction errors of the current block are transformed, quantized, and entropy-encoded.

FIG. 9 is a diagram illustrating examples of a method of partitioning a MB into a plurality of blocks for a temporal prediction operation. The MB partitioning method illustrated in FIG. 9 is defined in the ISO/IEC 14496-10 and ITU-T Rec. H.264 standards. In the MB partitioning method of FIG. 9, a 16×16 MB may be used as is or is partitioned into a pair of 16×8 blocks, a pair of 8×16, or two pairs of 8×8 blocks and is temporally predicted using a motion vector of each of the blocks into which it is partitioned. An 8×8 block can be used as is or can be sub-partitioned into a pair of 8×4 blocks, a pair of 4×8 blocks, or two pairs of 4×4 blocks, thus enabling detailed motions to be precisely detected.

In a temporal prediction operation, a previous alpha channel image may be two or four times enlarged, and then motion estimation is performed on the enlarged previous alpha channel image in units of half-pixels or quarter-pixels. In order to enlarge the previous alpha channel image, a bi-linear interpolation method may be used in an MPEG-4 approach, or a 6 tap filter-based interpolation method may be used in an H.264 approach. However, in order to reduce the amount of computation required for processing a gray alpha channel image, such motion estimation process may be skipped. Alternatively, such motion estimation process may be performed using one of the interpolation methods mentioned above or another interpolation method that can lead to a reduction in the total amount of computation required for processing a gray alpha channel image.

Figures 10A, 10B:
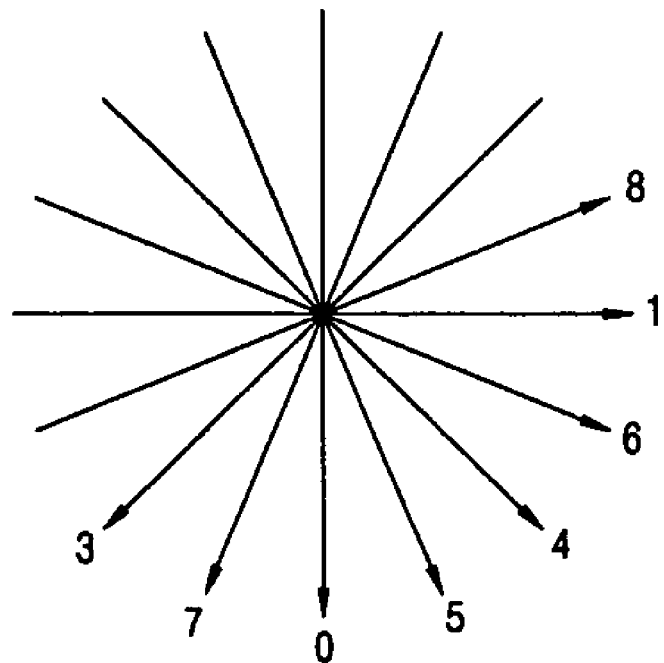
FIG. 10 is a diagram illustrating the locations of a set of pixels of a current block to be spatially predicted and pixels spatially adjacent to the set of pixels of the current block.

FIG. 10A illustrates the locations of a set of pixels of a current block to be spatially predicted and pixels spatially adjacent to the set of pixels. A spatial prediction method illustrated in FIG. 10A is defined in the ISO/IEC 14496-10 and ITU-T Rec. H.264 standards. In the spatial prediction method of FIG. 10A, the values of pixels Pa, Pb, . . . , and Pq of a 4×4 block are spatially predicted using the values of pixels P1, P2, . . . , and P12 which are spatially adjacent to the pixels Pa, Pb, and Pq and have already been encoded and then restored.

FIG. 10B illustrates a total of 9 prediction directions (i.e., zero through eighth prediction directions) in which the set of pixels of the current block are spatially predicted through projection of pixels spatially adjacent to the set of pixels of the current block. Referring to FIG. 10B, the values of the pixels Pa, Pe, Pi, and Pm are predicted by projecting the pixel P1 in the zero prediction direction, the values of the pixels Pb, Pf, Pj, and Pn are predicted by projecting the pixel P2 in the zero prediction direction, the values of the pixels Pc, Pg, Pk, and Po are predicted by projecting the pixel P3 in the zero prediction direction, and the values of the pixels Pd, Ph, Pl, and Pq are predicted by projecting the pixel P4 in the zero prediction direction. In this manner, the pixels Pa, Pb, . . . , and Pq are predicted by projecting the pixels P1, P2, . . . , and P12 in each of the zero through eighth prediction directions.

The temporal and spatial prediction methods illustrated in FIGS. 9 and 10A and 10B, respectively, have been described above as being based on existing standard techniques but are not restricted to them.

Figure 11:
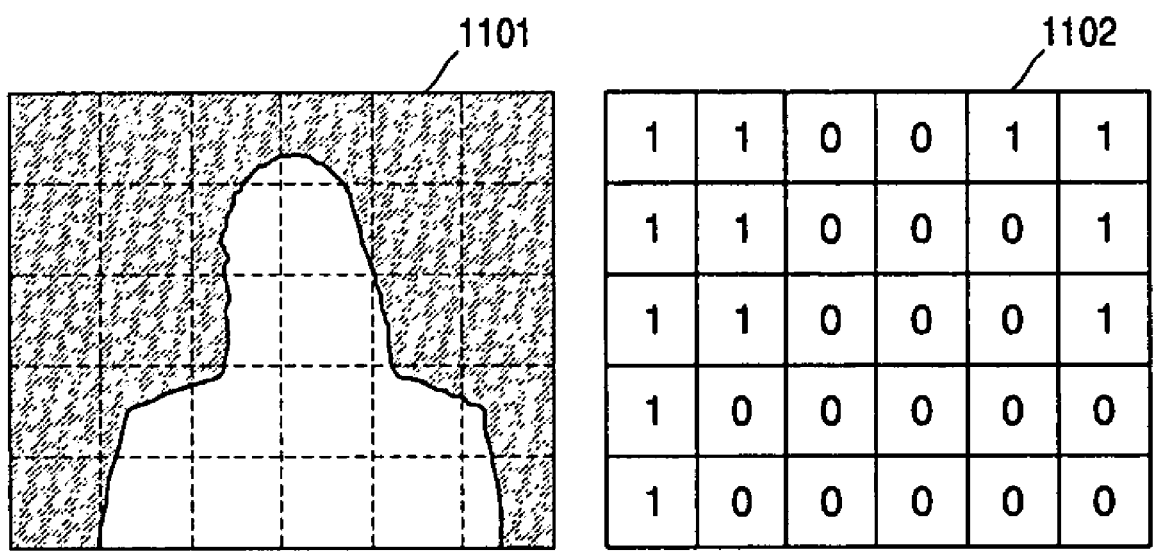
FIG. 11 is a diagram illustrating an example of a gray alpha channel image and whether each of a plurality of MBs of the gray alpha channel image is transparent or opaque.

FIG. 11 is a diagram illustrating an example of a gray alpha channel image and whether each of a plurality of MBs of the gray alpha channel image 1101 is transparent or opaque. Referring to FIG. 11, MBs illustrated in image 1102 having a value of 1 are transparent, and MBs having a value of 0 are opaque. Image 1102 is a bit value representation of the image 1101. The MBs having a value of 1 are classified as background image portions. Thus, gray alpha components of each of the MBs having a value of 1 are restored through encoding and decoding operations. However, the MBs having a value of 1 do not have brightness and hue components and thus is exempted from a brightness and hue component encoding operation. The gray alpha components of each of the MBs of the gray alpha channel image are encoded and decoded through an intra- or inter-prediction compensation operation regardless of whether a corresponding MB is transparent or opaque. However, the MBs having a value of 0 are classified as foreground image portions and thus, they have brightness and hue components. Therefore, the MBs having a value of 1 are encoded and then decoded through an intra- or inter-prediction compensation operation.

Figure 12:
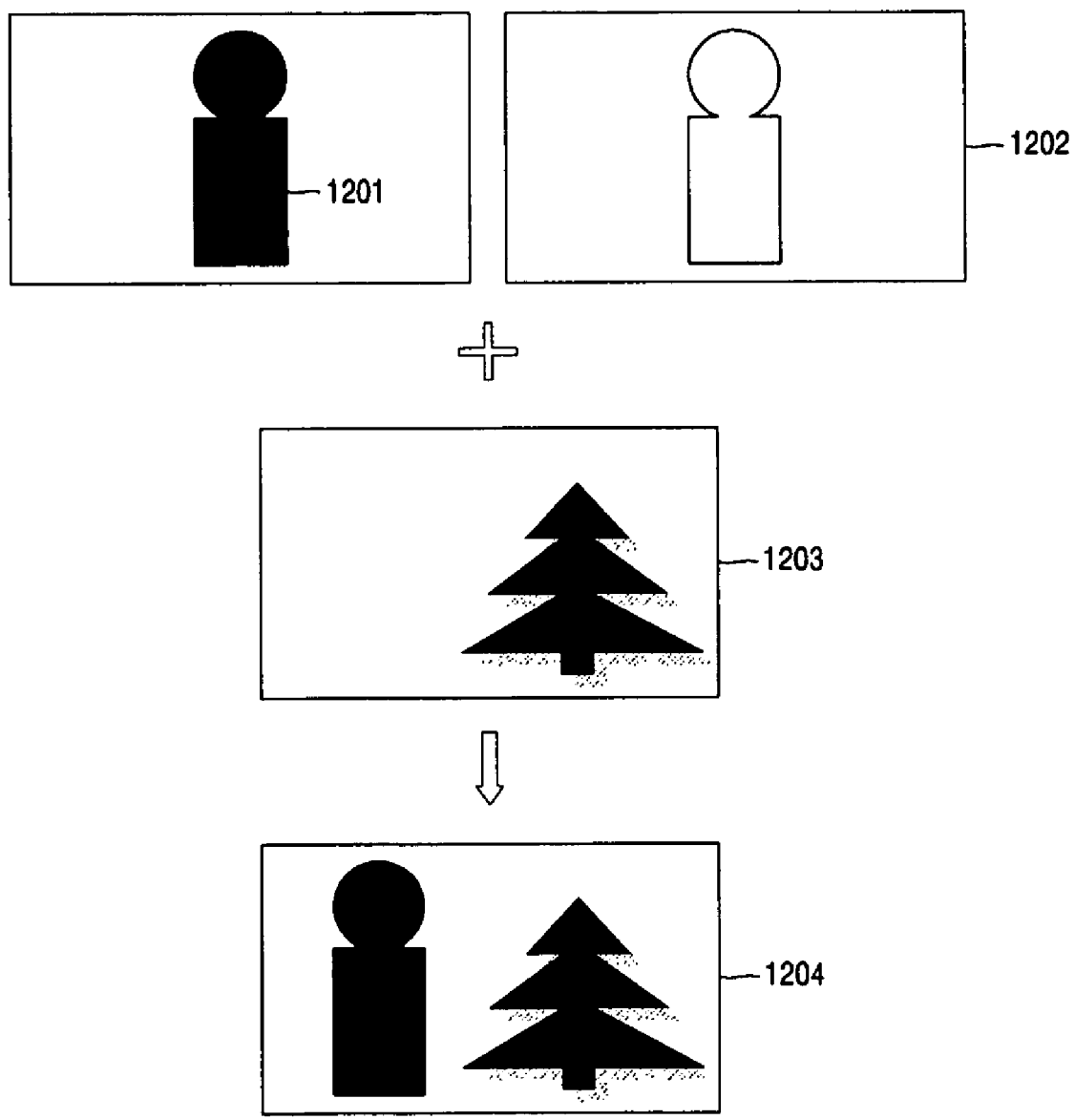
FIG. 12 is a diagram illustrating an example of the synthesis of a general image and a gray alpha channel image.

FIG. 12 is a diagram illustrating an example of the synthesis of an image containing a gray alpha channel image with an image having an arbitrary brightness and hue component. Referring to FIG. 12, reference numeral 1201 represents a foreground image zone having brightness and hue components, and reference numeral 1202 represents a gray alpha channel image for the foreground image zone 1201. The foreground image zone 1201 is synthesized with an image 1203 having an arbitrary brightness and hue component using the gray alpha channel image 1202, thereby generating a synthesized image 1204. This method of synthesizing the foreground image zone 1201 with the image 1203 may be used to generate a new background image in the process of editing broadcast content. Supposing that Nyuv, Na, Myuv, and Pyuv represent a brightness and hue component of the foreground image zone 1201, a gray alpha component of the foreground image zone 1201, a brightness and hue component of the image 1203, and a brightness and hue component of the synthesized image 1204, respectively, the brightness and hue component Pyuv of the synthesized image 1204 can be obtained using Equation (1):

$$P_{yuv} = \frac{(2^n - 1 - N_\alpha) \times M_{yuv} + (N_\alpha \times N_{yuv})}{2^n - 1}. \tag{1}$$

The gray alpha component Na of the foreground image zone 1201 is represented by n bits. For example, if the gray alpha component Na of the foreground image zone 1201 is represented by 8 bits, it may have a value between 0 and 255. The gray alpha component Na of the foreground image 1201 is used as a weight in averaging the brightness and hue component Nyuv of the foreground image zone 1201 and the brightness and hue component Myuv of the image 1203. Accordingly, if the gray alpha component Na of the foreground image zone 1201 has a value of 0, a corresponding portion of the foreground image zone 1201 is considered as being a background image portion. Thus, the gray alpha component Na of the foreground image zone 1201 does not affect the synthesized image 1204 regardless of the value of the brightness and hue component Nyuv of the foreground image zone 1201.

The present invention can be realized as computer-readable codes written on a computer-readable recording medium. The computer-readable recording medium includes nearly all kinds of recording devices on which data can be stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that the computer-readable codes can be stored and executed in a decentralized manner. A functional program, codes, and code segments necessary for realizing the embodiments of the present invention can be easily deduced by one of ordinary skill in the art.

As described above, according to aspects of the present invention, a gray alpha component is used as a weight when synthesizing two images and also serves as a mask for separating a foreground image zone of each of the images from a background image zone of a corresponding image. Thus, there is no need to encode or decode binary data for separating the foreground and background image zones of the corresponding image from each other, thus considerably enhancing the entire encoding efficiency and reducing the complexity of the synthesizing of the images.

In addition, according to aspects of the present invention, it is possible to more considerably enhance the entire encoding efficiency by determining whether to encode a brightness and hue component of the background image zone of each of the images based on whether the images include gray alpha components. Moreover, it is possible to more considerably reduce the complexity of synthesizing of the images by determining whether to decode the brightness and hue component of the background image zone of each of the images based on a result of decoding the gray alpha channel components of each of the images.

Furthermore, it is possible to even more considerably enhance the entire encoding efficiency by setting an MB skip flag for a gray alpha component to 1 and thus preventing unnecessary encoding of prediction additional information and prediction errors in an intra prediction mode.

An image containing a gray alpha channel image can be encoded or decoded independently of other typical images not containing a gray alpha channel image, and the apparatus for encoding and decoding an image containing a gray alpha channel image according to the present invention is compatible with existing standard techniques, for example, H.264-based techniques. Thus, it is possible to achieve a high encoding efficiency with a small amount of computation.

Aspects of the present invention are applicable to an image containing a binary alpha channel image as well as an image containing a gray alpha channel image. In other words, in the case of encoding or decoding an image containing a binary alpha channel image in units of MBs, brightness and hue components of each of the MBs of the image data may not be encoded or decoded if a corresponding MB is determined to belong to a background image zone of the image data. Therefore, it is possible to enhance the efficiency of encoding the image data and reduce the amount of computation required for encoding the image data.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to encode an image containing a gray alpha channel image, the apparatus encodes the image including gray alpha components and brightness and hue components in units of predetermined blocks, the apparatus comprising:
a block data reception unit which receives image data of a block currently being input to the apparatus and classifies the current block either as a foreground image portion or as a background image portion according to the values of the gray alpha components included in the current block;
a foreground image encoding unit which sequentially encodes the gray alpha components and the brightness and hue components of the current block if the current block is classified as the foreground image portion; and
a background image encoding unit which encodes the gray alpha components of the current block without encoding initial brightness and hue components of the current block if the current block is classified as the background image portion,
wherein the gray alpha components are included in the current block in advance for serving as a mask for classifying the foreground image portion and the background image portion in the image and the values of the gray alpha components indicate a degree of opacity of the current block and serve as weights for the brightness and hue components of the current block when synthesizing a plurality of images.

2. An apparatus to encode an image containing a gray alpha channel image, the apparatus encoding the image including gray alpha components and brightness and hue components in units of predetermined blocks, the apparatus comprising:
a block data reception unit which receives image data of a block currently being input to the apparatus and classifies the current block either as a foreground image portion or as a background image portion according to the values of the gray alpha components included in the current block;
a foreground image encoding unit which sequentially encodes the gray alpha components and the brightness and hue components of the current block if the current block is classified as the foreground image portion; and
a background image encoding unit which encodes the gray alpha components of the current block without encoding initial brightness and hue components of the current block if the current block is classified as the background image portion,
wherein the foreground image encoding unit comprises:
a gray prediction error generation unit which generates gray prediction errors of the current block;
a gray prediction error encoding unit which decides whether to encode the generated gray prediction errors of the current block based on a result of comparing a sum of absolute values of the generated gray prediction errors of the current block with a predetermined critical value;

a brightness and hue prediction error generation unit which generates brightness and hue prediction errors of the current block;

a brightness and hue prediction error encoding unit which decides whether to encode the generated brightness and hue prediction errors of the current block based on the result of the comparing of the absolute values of the gray prediction errors of the current block with the predetermined critical value; and a bitstream generation unit which generates a bitstream based on the comparing results obtained by the gray prediction error encoding unit and the comparing results obtained by the brightness and hue prediction error encoding unit.

3. The apparatus of claim 1, wherein the background image encoding unit comprises:

a gray prediction error generation unit which generates gray prediction errors of the current block;

a gray prediction error encoding unit which decides whether to encode the generated gray prediction errors of the current block based on a result of comparing the gray prediction errors of the current block with a predetermined critical value; and a bitstream generation unit which generates a bitstream based on the comparing results obtained by the gray prediction error encoding unit.

4. The apparatus of claim 2, wherein the gray prediction error encoding unit skips the encoding of the generated gray prediction errors of the current block regardless of a prediction mode of the current block if each of the generated gray prediction errors of the current block is smaller than the predetermined critical value.

5. The apparatus of claim 2, wherein the brightness and hue prediction error generation unit skips the encoding of generated the brightness and hue components of the current block if all of the gray alpha components of the current block have a value of 0.

6. The apparatus of claim 2, wherein the brightness and hue prediction error encoding unit skips the encoding of the generated brightness and hue prediction errors of the current block if each of the gray prediction errors of the current block is smaller than the predetermined critical value and a prediction mode of the current block is an inter mode.

7. The apparatus of claim 3, wherein the gray prediction error encoding unit skips the encoding of the generated gray prediction errors of the current block regardless of a prediction mode of the current block if each of the generated gray prediction errors of the current block is smaller than the predetermined critical value.

8. A method of encoding an image containing a gray alpha channel image, which encodes an image including gray alpha components and brightness and hue components in units of predetermined blocks, and which is performed by an image encoding apparatus, the method comprising:

classifying a current block which is received by the image encoding apparatus either as a foreground image portion or as a background image portion according to values of the gray alpha components included in the current block;

sequentially encoding the gray alpha components and the brightness and hue components of the current block if the current block is classified as the foreground image portion; and encoding the gray alpha components of the current block without encoding initial brightness and hue components of the current block if the current block is classified as the background image portion, wherein the gray alpha components is included in the current block in advance for serving as a mask for classifying the foreground image portion and the background image portion in the image and the values of the gray alpha components indicate a degree of opacity of the current block and serve as weights for the brightness and hue components of the current block when synthesizing a plurality of images.

9. The method of claim 8, wherein the classifying of the current block, comprises classifying the current block as the foreground image portion if all of the gray alpha components of the current block have a value of 0 and classifying the current block as the background image portion otherwise.

10. The method of claim 8, wherein the sequentially encoding of the gray alpha components and the brightness and hue components of the current block is skipped if each of the gray alpha components of the current block is smaller than a predetermined critical value.

11. The method of claim 10, wherein the encoding of the gray alpha components of the current block is skipped regardless of a prediction mode of the current block when the current block is classified as the background image portion.

12. The method of claim 10, wherein the sequentially encoding of the gray alpha components and the brightness and hue components of the current block is skipped if a prediction mode of the current block is an inter mode.

13. The method of claim 8, wherein the encoding of the gray alpha components of the current block is skipped if each of the gray alpha components of the current block is smaller than a predetermined critical value.

14. The method of claim 13, wherein the encoding of the gray alpha components of the current block is skipped regardless of a prediction mode of the current block.

15. An apparatus to decode an image including a gray alpha channel image, which decodes a bitstream into which an image including gray alpha components and/or brightness and hue components is encoded, the apparatus comprising:

a bitstream interpretation unit which interprets the bitstream in units of predetermined blocks and classifies a current block obtained as one of the interpretation results either as a foreground image portion or as a background image portion;

a foreground image decoding unit which generates a first restored gray alpha channel image and a restored brightness and hue image by sequentially decoding the gray alpha components and the brightness and hue components of the current block if the current block is classified as the foreground image portion; and a background image decoding unit which generates a second restored gray alpha channel image by decoding the gray alpha components of the current block without decoding initial brightness and hue components of the current block if the current block is classified as the background image portion, wherein the gray alpha components are included in the current block in advance for serving as a mask for classifying the foreground image portion and the background image portion in the image and values of the gray alpha components indicate a degree of opacity of the current block and serve as weights for the brightness and hue components of the current block when synthesizing a plurality of images.

16. The apparatus of claim 15, wherein the foreground image decoding unit comprises:

a gray prediction error decoding unit which decodes gray prediction errors corresponding to the encoded gray alpha components of the current block;

a gray alpha component restoration unit which restores the gray alpha channel image from the decoded gray prediction errors;

a brightness and hue prediction error decoding unit which decodes brightness and hue prediction errors corresponding to the encoded brightness and hue components of the current block; and a brightness and hue component restoration unit which restores the brightness and hue image from the decoded brightness and hue prediction errors.

17. The apparatus of claim 15, wherein the background image decoding unit comprises:

a gray prediction error decoding unit which decodes gray prediction errors corresponding to the encoded gray alpha components of the current block; and a gray alpha component restoration unit which restores the gray alpha channel image from the decoded gray prediction errors.

18. The apparatus of claim 16, wherein the gray prediction error decoding unit decodes the gray prediction errors of the current block as 0 if the gray prediction errors of the current block have not been encoded in the gray alpha components of the current block.

19. The apparatus of claim 16, wherein the brightness and hue prediction error decoding unit skips the decoding of the encoded brightness and hue components of the current block if the brightness and hue components of the current block have not been encoded in the image.

20. The apparatus of claim 19, wherein the brightness and hue prediction error decoding unit decodes the brightness and hue components of the current block as 0 if the brightness and hue components of the current block have not been encoded in the image.

21. The apparatus of claim 17, wherein the gray prediction error decoding unit decodes gray prediction errors from the encoded gray alpha components of the current block as 0 if the gray prediction errors of the current block have not been encoded.

22. A method of decoding an image including a gray alpha channel image, which decodes a bitstream into which an image including gray alpha components and brightness and hue components is encoded, and which is performed by an image decoding apparatus, the method comprising:

interpreting the bitstream which is received by the image decoding apparatus in units of predetermined blocks and classifying a current block obtained as one of the interpretation results either as a foreground image portion or as a background image portion;

generating a first restored gray alpha channel image and a restored brightness and hue image by sequentially decoding the gray alpha components and the brightness and hue components of the current block if the current block is classified as the foreground image portion; and generating a second restored gray alpha channel image by decoding the gray alpha components of the current block without decoding initial brightness and hue components of the current block if the current block is classified as the background image portion, wherein the gray alpha components are included in the current block in advance for serving as a mask for classifying the foreground image portion and the background image portion in the image and values of the gray alpha components indicate a degree of opacity of the current block and serve as weights for the brightness and hue components of the current block when synthesizing a plurality of images.

23. The method of claim 22, wherein the generating the first restored gray alpha channel image and the restored brightness and hue image comprise decoding gray prediction errors and brightness and hue prediction errors of the current block from the gray alpha components and the brightness and hue components, respectively, as 0 if the gray prediction errors and the brightness and hue prediction errors have not been encoded in the image.

24. The method of claim 22, wherein the generating the second restored gray alpha channel image comprises decoding gray prediction errors of the current block from the gray alpha components as 0 if the gray prediction errors have not been encoded in the image.

25. A non-transitory computer-readable recording medium storing a computer program for executing a method of encoding an image containing a gray alpha channel image, which encodes an image including gray alpha components and brightness and hue components in units of predetermined blocks, the method comprising:

classifying a current block either as a foreground image portion or as a background image portion according to values of the gray alpha components included in the current block;

sequentially encoding the gray alpha components and the brightness and hue components of the current block if the current block is classified as the foreground image portion; and encoding the gray alpha components of the current block without encoding initial brightness and hue components of the current block if the current block is classified as the background image portion, wherein the gray alpha components is included in the current block in advance for serving as a mask for classifying the foreground image portion and the background image portion in the image and the values of the gray alpha components indicate a degree of opacity of the current block and serve as weights for the brightness and hue components of the current block when synthesizing a plurality of images.

26. A non-transitory computer-readable recording medium storing a computer program for executing a method of decoding an image including a gray alpha channel image, which decodes a bitstream into which an image including gray alpha components and brightness and hue components is encoded, the method comprising:

interpreting the bitstream in units of predetermined blocks and classifying a current block obtained as one of the interpretation results either as a foreground image portion or as a background image portion;

generating a first restored gray alpha channel image and a restored brightness and hue image by sequentially decoding the gray alpha components and the brightness and hue components of the current block if the current block is classified as the foreground image portion; and generating a second restored gray alpha channel image by decoding the gray alpha components of the current block if the current block without decoding the brightness and hue components of the current block is classified as the background image portion, wherein the gray alpha components are included in the current block in advance for serving as a mask for classifying the foreground image portion and the background image portion in the image and values of the gray alpha components indicate a degree of opacity of the current block and serve as weights for the brightness and hue components of the current block when synthesizing a plurality of images.

* * * * *